Feb. 22, 1949.                J. W. COOK                2,462,363
                                SPRING
                          Filed May 28, 1946
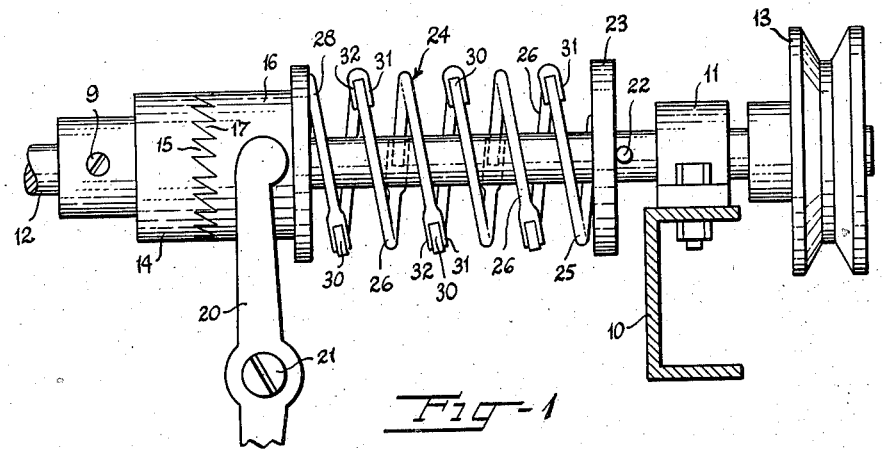
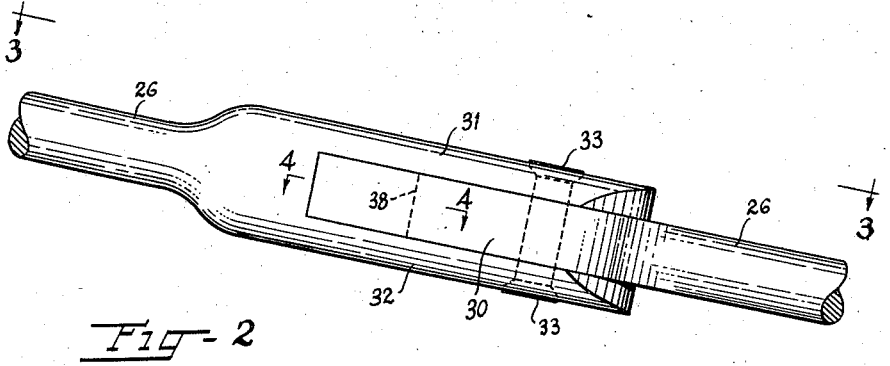
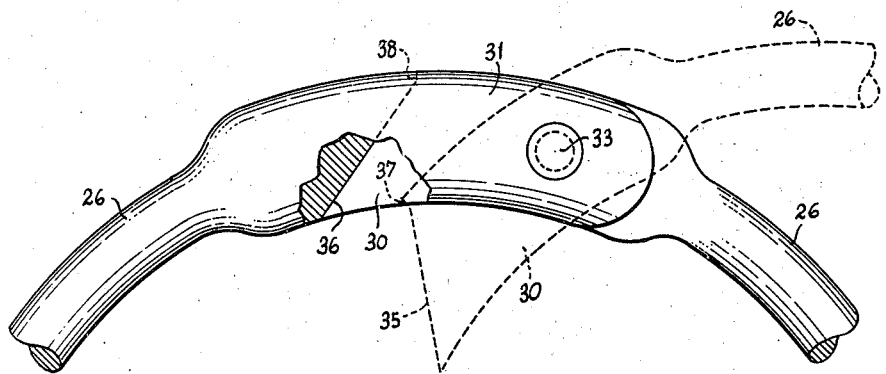
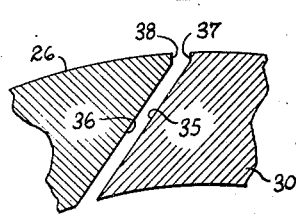
Inventor:
John Wesley Cook
By
Attorney Patented Feb. 22, 1949

2,462,363

UNITED STATES PATENT OFFICE 2,462,363

SPRING

John W. Cook, York, S. C.

Application May 28, 1946, Serial No. 672,777

2 Claims. (Cl. 267—1)

This invention relates to a compression spring or tension spring, or in fact it could be a torsion spring, which is adapted to be placed around a shaft in a piece of machinery.

Heretofore, when compression springs, tension springs, or torsion springs have been placed around shafts in machinery, when it is necessary to replace this spring on account of breakage or loss of strength, it has been required to dismantle portions of the machinery, in order to remove the spring from the shaft and install a new one. By my invention in providing a spring having joints therein, whereby the spring can be opened out into a substantially straight path, it is possible to remove or install a spring around a shaft or other piece of machinery without the necessity of dismantling portions of the machinery. While I have shown my invention as applied to a clutch and pulley disposed on a shaft, it is evident that it can be employed in any places desired, where it would facilitate removal and installation of a spring without the necessity of dismantling portions of, or all of the machine with which it is associated.

It is an object of this invention to provide a convoluted spring, which is adapted to be disposed around a shaft or other portion of machinery, having joints therein, preferably about 240° apart, so as to stagger these joints along the spring and not cause all of them to be disposed at one point.

It is another object of this invention to provide a torsion spring, compression spring, tension spring and the like, having joints therein whereby it can be wound around and installed in position around a shaft without the necessity of removing the portions of the machinery associated with the shaft.

Some of the objects of the invention having been stated, other objects will appear as the description proceeds, when taken in connection with the accompanying drawings, in which:

Figure 1 is an elevation of a piece of apparatus showing my invention applied thereto;

Figure 2 is a view looking from the inside of the spring at one of the joints, and showing the same on an enlarged scale;

Figure 3 is a top plan view looking from substantially along the line 3—3 in Figure 2;

Figure 4 is a sectional detail taken along the line 4—4 in Figure 2.

Referring more specifically to the drawings, the numeral 10 indicates a suitable support on which a bearing 11 is mounted, and in which bearing a shaft 12 is disposed, the other end of said shaft being mounted in a suitable bearing, not shown. This shaft is adapted to be driven in any suitable manner such as by having a pulley 13 fixedly secured thereon by any suitable means, such as a set screw 9, a portion 14 of a clutch mechanism having serrated face portion 15. Slidably mounted on the shaft is another part of the clutch designated at 16, which also has a serrated face, as at 17, and this portion 16 is adapted to be moved away from the portion 15 by any suitable means, such as a lever 20 pivoted, as at 21. The shaft has disposed therein a pin 22 confining a disc 23, and between disc 23 and portion 16 is adapted to be placed a compression spring 24. This compression spring 24 is divided into a plurality of sections 25, 26, and 28, which are pivotally joined together by means of portion 25 and 26 having a flat end portion 30 fitting in between two prongs 31 and 32 on the end of portion 25 or 26, and pivotally secured to each other by means of a rivet 33. The free end of member 30 has a face portion 35, which, when the spring is in assembled position, is adapted to fit against a shoulder 36 at the base of the cavity between members 31 and 32. The face 35 has a projection 37 which is adapted to snap into a cavity 38 at the upper end of face 36 to hold the spring in assembled position. In assembled position, the parts will occupy the position in bold lines in the drawings, but when it is desired to dismantle or to assemble the spring around the shaft, then the parts at each joint would be moved to the dotted line position, shown in Figure 3, and the spring can be led the desired number of convolutions around the shaft to where they would occupy the position shown in Figure 1 and the bold line position in Figures 2 and 3.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. A convoluted spring having a plurality of sections connected together by pivoted joints about which the portions of the spring can be pivoted radially outwardly for removal from around the shaft, and can be pivoted radially inwardly for installation around the shaft, the joints in the spring comprising each section having shoulder portions adapted to fit against each other when the spring is in assembled or spiral position.

2. A convoluted spring having a plurality of sections connected together by pivoted joints about which the portions of the spring can be pivoted radially outwardly for removal from around the shaft, and can be pivoted radially inwardly for installation around the shaft, the joints in the spring comprising each section having shoulder portions adapted to fit against each other when the spring is in assembled or spiral position, and means for holding the pivotal portions in assembled position.

JOHN W. COOK.

REFERENCES CITED

The following references are of record in the file of this patent:

UNITED STATES PATENTS

| Number | Name | Date |
|---|---|---|
| 631,956 | Diescher | Aug. 29, 1899 |
| 851,124 | Flatean | Apr. 23, 1907 |
| 1,635,496 | Peigne | July 12, 1927 |